(12) United States Patent
Skolmoski

(10) Patent No.: US 6,574,352 B1
(45) Date of Patent: Jun. 3, 2003

(54) PROCESS FOR ANTICIPATION AND TRACKING OF EYE MOVEMENT

(75) Inventor: Philip Skolmoski, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/314,425

(22) Filed: May 18, 1999

(51) Int. Cl.$^7$ ................................................. G06K 9/00
(52) U.S. Cl. ........................ 382/103; 382/108; 348/115; 348/169; 434/44
(58) Field of Search ................................. 382/103, 108, 382/131, 154, 173, 204; 345/586, 634, 848, 441, 582, 588; 348/115, 42, 116, 121, 122, 123, 129, 128, 169, 120, 172; 340/988, 990; 434/44, 30

(56) References Cited

U.S. PATENT DOCUMENTS

| | | | |
|---|---|---|---|
| 4,634,384 A | | 1/1987 | Neves et al. .................. 434/44 |
| 5,266,930 A | * | 11/1993 | Ichikawa et al. .............. 348/9 |
| 5,841,443 A | * | 11/1998 | Einkauf ....................... 345/586 |
| 6,222,937 B1 | * | 4/2001 | Cohen et al. ................ 382/154 |

FOREIGN PATENT DOCUMENTS

| | | |
|---|---|---|
| EP | 155858 A1 | 9/1985 |
| GB | 2179147 A | 2/1987 |
| WO | WO87/01571 | 3/1987 |

* cited by examiner

Primary Examiner—Timothy M. Johnson
Assistant Examiner—Sheela Chawan
(74) Attorney, Agent, or Firm—Thorpe North & Western, LLP

(57) ABSTRACT

A method for anticipation and tracking eye movement for head tracked projectors which divides a projection surface into spherical triangles and uses interpolating calibration values stored at each vertex of the triangle. A calibration map is used that contains information about the relationship between the user's head orientation and where they are looking with their eyes at each calibration point. The projection surface is divided into spherical triangles which are searched to find the triangle which contain the user's interpolated view point by performing a dot product test between the interpolated view point and the unit normal vectors inside the three planes that make up the sides of the spherical triangle extended back to the eye point. When a dot product test fails for any side of the triangle the pointer is followed to the adjacent triangle where the test starts over. When the triangle is found that has the interpolated view point inside it, the selected triangle is divided into three sub-triangles. Then the area of the sub-triangles inside the selected triangle is computed. The areas of the sub-triangles are then used to find ratios of the sub-triangles' areas versus the selected spherical triangle area for weighting the calibration points stored with each vertex. Then the weighted calibrations are added to the values for the interpolated view point. This creates a calibrated view point where the head tracked projector is then pointed and the computer generated simulated image is projected.

18 Claims, 5 Drawing Sheets

| | | | | |
|---|---|---|---|---|
| Vertex A | 0.0000 | 42.0000 | -0.0005 | Actual vertices for a triangle from a data base we created |
| Vertex B | -6.9881 | 40.4778 | 8.7587 | |
| Vertex C | 6.9881 | 40.4778 | 8.7587 | |
| Center of triangle | 0.0000 | 41.5802 | 5.9237 | Center of the triangle for reference |
| Area of triangle | 0.0358 | | | |

| Test Point | | | Calculated point from Interpolation | | |
|---|---|---|---|---|---|
| X | Y | Z | X | Y | Z |
| 0.0000 | 42.0000 | -0.0005 | 0.0000 | 42.0000 | -0.0005 |
| -0.4867 | 41.9923 | 0.6417 | -0.4809 | 41.9925 | 0.6341 |
| -0.9003 | 41.9716 | 1.2541 | -0.8914 | 41.9722 | 1.2415 |
| -1.2439 | 41.9414 | 1.8363 | -1.2339 | 41.9424 | 1.8208 |
| -1.5209 | 41.9044 | 2.3884 | -1.5110 | 41.9058 | 2.3713 |
| -1.7348 | 41.8631 | 2.9105 | -1.7260 | 41.8647 | 2.8927 |
| -1.8893 | 41.8193 | 3.4027 | -1.8821 | 41.8211 | 3.3850 |
| -1.9881 | 41.7745 | 3.8654 | -1.9828 | 41.7763 | 3.8482 |
| -2.0352 | 41.7298 | 4.2991 | -2.0319 | 41.7317 | 4.2827 |
| -2.0344 | 41.6861 | 4.7041 | -2.0331 | 41.6879 | 4.6886 |
| -1.9896 | 41.6440 | 5.0809 | -1.9901 | 41.6458 | 5.0665 |
| -1.9048 | 41.6039 | 5.4301 | -1.9068 | 41.6056 | 5.4167 |
| -1.7840 | 41.5660 | 5.7520 | -1.7871 | 41.5676 | 5.7396 |
| -1.6311 | 41.5304 | 6.0471 | -1.6351 | 41.5319 | 6.0358 |
| -1.4502 | 41.4971 | 6.3160 | -1.4545 | 41.4985 | 6.3057 |
| -1.2451 | 41.4660 | 6.5590 | -1.2495 | 41.4673 | 6.5497 |
| -1.0201 | 41.4371 | 6.7768 | -1.0241 | 41.4384 | 6.7684 |
| -0.7790 | 41.4103 | 6.9698 | -0.7824 | 41.4115 | 6.9622 |
| -0.5259 | 41.3856 | 7.1386 | -0.5284 | 41.3867 | 7.1317 |
| -0.2649 | 41.3628 | 7.2836 | -0.2662 | 41.3639 | 7.2773 |
| 0.0000 | 41.3420 | 7.4054 | 0.0000 | 41.3430 | 7.3997 |
| 0.2647 | 41.3232 | 7.5046 | 0.2661 | 41.3242 | 7.4994 |
| 0.5253 | 41.3067 | 7.5818 | 0.5281 | 41.3075 | 7.5770 |
| 0.7777 | 41.2924 | 7.6376 | 0.7819 | 41.2932 | 7.6331 |
| 1.0178 | 41.2807 | 7.6726 | 1.0233 | 41.2814 | 7.6683 |
| 1.2418 | 41.2718 | 7.6874 | 1.2484 | 41.2724 | 7.6833 |
| 1.4455 | 41.2660 | 7.6828 | 1.4531 | 41.2665 | 7.6787 |
| 1.6252 | 41.2637 | 7.6593 | 1.6336 | 41.2641 | 7.6552 |
| 1.7768 | 41.2652 | 7.6177 | 1.7857 | 41.2655 | 7.6136 |
| 1.8966 | 41.2707 | 7.5586 | 1.9058 | 41.2711 | 7.5543 |
| 1.9805 | 41.2806 | 7.4827 | 1.9898 | 41.2810 | 7.4781 |
| 2.0247 | 41.2950 | 7.3906 | 2.0338 | 41.2955 | 7.3857 |
| 2.0253 | 41.3141 | 7.2829 | 2.0341 | 41.3147 | 7.2775 |
| 1.9785 | 41.3378 | 7.1602 | 1.9868 | 41.3385 | 7.1543 |
| 1.8804 | 41.3659 | 7.0231 | 1.8880 | 41.3667 | 7.0164 |
| 1.7272 | 41.3980 | 6.8720 | 1.7338 | 41.3989 | 6.8646 |
| 1.5149 | 41.4332 | 6.7076 | 1.5205 | 41.4344 | 6.6992 |
| 1.2398 | 41.4707 | 6.5301 | 1.2442 | 41.4721 | 6.5206 |
| 0.8981 | 41.5090 | 6.3401 | 0.9010 | 41.5106 | 6.3294 |
| 0.4860 | 41.5463 | 6.1378 | 0.4874 | 41.5480 | 6.1260 |

*Fig. 5A*

| Area Ratios | | |
|---|---|---|
| alpha | beta | gamma |
| 1.0000 | 0.0000 | 0.0000 |
| 0.9277 | 0.0705 | 0.0018 |
| 0.8588 | 0.1341 | 0.0071 |
| 0.7934 | 0.1911 | 0.0156 |
| 0.7313 | 0.2417 | 0.0271 |
| 0.6726 | 0.2861 | 0.0413 |
| 0.6172 | 0.3248 | 0.0580 |
| 0.5652 | 0.3578 | 0.0770 |
| 0.5165 | 0.3855 | 0.0980 |
| 0.4710 | 0.4083 | 0.1208 |
| 0.4287 | 0.4263 | 0.1450 |
| 0.3895 | 0.4399 | 0.1706 |
| 0.3534 | 0.4495 | 0.1971 |
| 0.3203 | 0.4553 | 0.2245 |
| 0.2901 | 0.4576 | 0.2523 |
| 0.2628 | 0.4567 | 0.2805 |
| 0.2384 | 0.4530 | 0.3086 |
| 0.2167 | 0.4468 | 0.3365 |
| 0.1977 | 0.4384 | 0.3639 |
| 0.1814 | 0.4281 | 0.3906 |
| 0.1676 | 0.4162 | 0.4162 |
| 0.1564 | 0.4031 | 0.4406 |
| 0.1476 | 0.3890 | 0.4635 |
| 0.1412 | 0.3743 | 0.4845 |
| 0.1371 | 0.3593 | 0.5036 |
| 0.1353 | 0.3443 | 0.5204 |
| 0.1357 | 0.3297 | 0.5347 |
| 0.1382 | 0.3157 | 0.5462 |
| 0.1428 | 0.3026 | 0.5546 |
| 0.1493 | 0.2909 | 0.5598 |
| 0.1578 | 0.2807 | 0.5615 |
| 0.1682 | 0.2724 | 0.5594 |
| 0.1804 | 0.2662 | 0.5534 |
| 0.1943 | 0.2626 | 0.5431 |
| 0.2099 | 0.2618 | 0.5283 |
| 0.2271 | 0.2641 | 0.5088 |
| 0.2459 | 0.2698 | 0.4843 |
| 0.2661 | 0.2792 | 0.4547 |
| 0.2877 | 0.2926 | 0.4197 |
| 0.3106 | 0.3103 | 0.3791 |

*Fig. 5B* ized image is expensive and technically complex. Reduced field of rotation optical head trackers have also been experimented with but these have a limited volume where measurements can occur.

PROCESS FOR ANTICIPATION AND TRACKING OF EYE MOVEMENT

TECHNICAL FIELD

This invention relates generally to the field of computer graphics projection and display, and more particularly to anticipating a user's eye movement in a projection based, computer graphics simulation system.

BACKGROUND ART

Head tracked area-of-interest image projection systems are used for flight simulators and military flight simulator training. The ideal simulator should have eye limited resolution and an unlimited field of resolution. Many systems provide either high resolution over a narrow field of view or low resolution over a wide field of view because of computing power restrictions and optical imaging limitations. Either choice limits training effectiveness. Recent simulator projector systems have been developed to give a greater field of view combined with a higher resolution image at the user's focal point of interest. Such a device uses a head tracked projector and a compact target projector to form images on a dome within which the user is enclosed. A high-resolution inset provides good imagery for the foveal vision, and the background forms imagery for the peripheral vision. In such a system, only two-image generator channels are needed to cover the entire field of the dome which is very efficient. These devices combine to create a cost effective solution for air-to-air and air-to-ground flight combat training.

The head tracked projector systems display the image a pilot would see out the window of their aircraft by placing high-resolution imagery only where the pilot is looking over a full 360 degree field of regard. To do this, the simulation device requires information about where the pilot is looking. The information is provided by a head tracker attached to the pilot's helmet. This information is used to tell the Image Generator (IG) where the pilot is looking so that the projector port for the image can be oriented properly. The pilot gaze information is also used by the IG and its accompanying projector hardware to control the orienting of projector servos so the image is projected where the pilot is looking.

These activities must be carefully coordinated so the proper IG image is available to the projection hardware at the proper location on the dome surface. When the two processes are not carefully synchronized, the image will appear to slide around on the dome surface. If the information is too slow, the pilot may have already moved their head again so that the image will do appear to be lagging behind where the pilot is looking. The major criticism of head-tracked projector simulators which are currently known in the art is that the image generally lags behind where the pilot is looking.

There are several reasons for this lag. One problem is that the current hardware interfaces between head tracking devices and the IGs (or projectors) are too slow. The time delay between the measurement of and orientation and when the data is available to the IG and projection hardware is too long. Furthermore, the data is noisy, so even when the head tracker is at rest, there appears to be variations in the pilot's head position and orientation.

Many efforts have been made to overcome the disadvantages of the delay that currently exists in head tracked projectors. One method to decrease the lag is to increase the actual communication speed of the hardware. In another method, designers have been able to reduce some of the delay by double buffering the head tracker data so that it can be accessed asynchronously using the high speed communication hardware. These approaches reduce the lag but current hardware solutions have not been able to reduce the lag sufficiently.

Another possible method to minimize the delay in the delivery of head movement data is to try to anticipate a user's head motion which would help stabilize the image. Of course there is no way to truly anticipate where a pilot is going to look, but information based on a user's head motion can be used to try to anticipate where the pilot will be looking in the future. Experiments have been performed to discover a relationship between head motion and eye motion. Unfortunately, this type of research has not yielded any recognizable patterns of motion that are useful.

Other hardware solutions to overcome this problem have not been successful either. For example, a prototype head tracker using Helmholtz coils to measure the head orientation has been used but this approach is expensive and technically complex. Reduced field of rotation optical head trackers have also been experimented with but these have a limited volume where measurements can occur.

Extrapolating head movement using curve fitting, according to where the head is expected to be, does not create a good solution because noise in the head tracker makes extrapolation of the data unreliable. It is very difficult, if not impossible, to use the data from the head tracker to anticipate head motion. Accordingly, it would be an advantage over the state of the art to provide a method for anticipating and tracking eye movement which produces an image which does not appear to lag behind the user's vision or slide around on the projection surface.

OBJECTS AND SUMMARY OF THE INVENTION

It is an object of the present invention to provide a method for anticipation and tracking of a user's eye movement in a head tracked projector based simulator.

It is another object of the present invention to provide a method for anticipation and tracking of eye movement that establishes a relationship between a user's measured head orientation and where the user's eyes are actually looking.

It is another object of the present invention to provide a method for anticipation and tracking of eye movement where the image is more stable relative to the user's actual view point.

It is another object of the present invention to provide a method for anticipating and tracking a user's eye movement through using a database of stored calibration values.

It is another object of the present invention to provide a method for anticipating and tracking a user's eye movement using a database of stored calibration values to correct an interpolated view point and to determine where the image generator will project an image.

It is yet another object of the present invention to provide a method for anticipating and tracking a user's eye movement using a projection screen divided into spherical triangular regions which are stored in a database with calibration values.

The presently preferred embodiment of the present invention is a method for anticipating and tracking a user's eye movement which utilizes a head tracked area-of-interest image projection system having a head tracked projector. A dome surface is provided which is logically divided into a mesh of spherical triangles upon which the head tracked projector projects computer generated images. A database is provided in which calibration values are stored for each vertex of the spherical triangles, which represent the value of the difference between the user's head orientation and where the user is actually looking for a given head orientation. The user's view point is then interpolated onto the dome surface from the user's head orientation to determine where the image is that the user is viewing on the spherical dome. Next the mesh of spherical triangles is searched to find a selected triangle which contains the view point. This is done by traversing a linked list of the spherical triangles.

Once a spherical triangle is found that contains the interpolated view point, the selected triangle containing the view point is divided into three sub-triangles where the view point defines the common vertex for each of the sub-triangles. Then the surface area of each sub-triangle is calculated and the ratio of each sub-triangle's surface area to the selected triangle's surface area is found. The sub-triangles' surface area ratios are then multiplied by the calibration values associated with the vertex opposite the given sub-triangle to create weighted calibration values. Finally, the weighted calibration values are added to the interpolated view point to create a corrected interpolated view point which allows the head tracked projector to ascertain where the image should be displayed on the dome surface. Creating a corrected interpolated view point reduces the lag seen by the user and creates a more stable image. Most importantly, this invention corrects for the difference between the measured head orientation and where the eyes are looking.

These and other objects, features, advantages and aspects of the present invention will become apparent to those skilled in the art from a consideration of the following detailed description taken in combination with the accompanying drawings.

BRIEF DESCRIPTION OF THE DRAWINGS

FIGS. 5A–5B are tables of sample test points, calibration points, triangle areas, and sample calculations using the method for anticipating a user's eye movements.

DISCLOSURE OF THE INVENTION

Figure 1:
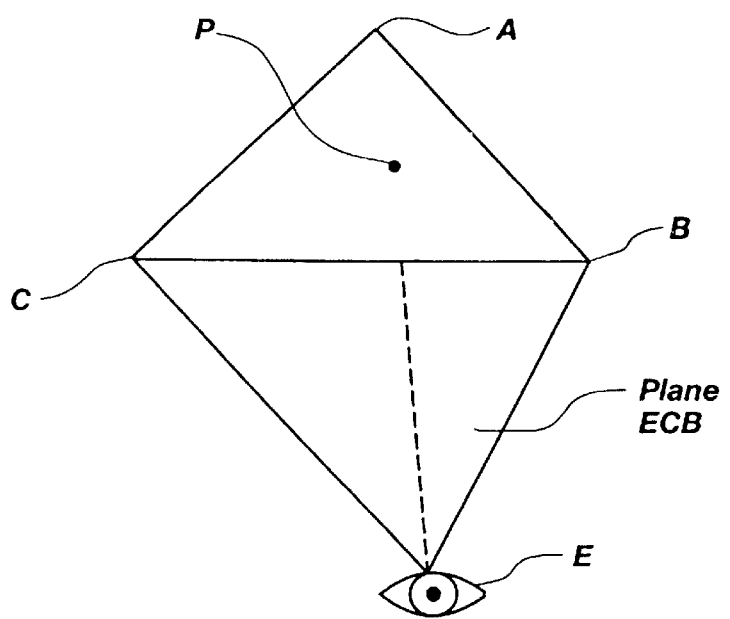
FIG. 1 shows a triangle used in the method for anticipating and tracking eye movement where a plane is made between the nominal eye point and two vertices of the triangle.

The method provided by this invention for the anticipation and tracking of eye movement contains two main parts. The first part is the off-line database generation that makes it possible for the second part, the real time calibration, to run efficiently. In general, the method is a spherical triangle interpolation scheme based on an interpolated view point within the triangle and interpolating calibration values stored at each vertex of the triangle.

The current invention uses a calibration map that contains information about the relationship between the user's head orientation and where they are looking with their eyes (presumably the calibration point). To create a calibration map, the user follows an image projected by the head tracked projection system. A measurement of the difference between the user's head orientation versus where the head tracked projection system is actually aiming the image is stored in the database. The calibration map can then be used to exaggerate head motion based on the calibrated difference between where the person was looking and how far their head moved. Essentially, the calibration value represents the user's recorded eye movement that cannot be measured by the head tracking equipment. The actual method used for collecting the calibration values could be performed in many ways and will be discussed in detail later. Regardless of how the calibration data is collected, the run time algorithm does not change significantly.

As mentioned above, the general run time algorithm is a spherical triangle interpolation scheme based on an interpolated view point within the triangle and interpolating the calibration values stored at each vertex of the triangle. The measured orientation of the current head orientation becomes the interpolated view point on the simulation projection dome.

The dome surface is mapped with a continuous mesh of spherical triangles. A spherical triangle is a triangle which is projected on a curved or domed surface and has curved or spherical edges. Spherical triangles are well known to those skilled in the art and familiar with spherical trigonometry. They can also be described as contoured triangles because of the triangles' curved nature on a curved projection surface. It should be realized that the curved projection surface may be fully or only partial spherical. In another embodiment of the invention the triangles used could be planar triangles on a flattened projection surface.

In the preferred embodiment of the invention, the mesh does not have any holes in it and a search algorithm can be used to find the triangle the interpolated view point is in. An alternative embodiment of the invention uses, an open mesh structure where planes must bound the mesh and then triangles referencing these planes point to null triangles on the other side of the plane. Accordingly, each triangle can be bounded by either one other triangle and two planes, or two other triangles and one plane. This alternative embodiment of the invention creates an extension to the search algorithm which provides a greater flexibility in the use of this algorithm. Each edge of the spherical triangles contains a pointer to the adjacent triangle or a null pointer if the mesh is not closed. The search algorithm uses these pointers in searching for the appropriate spherical triangle.

Referring now to FIG. 1, the spherical triangle containing the interpolated view point P or current head gaze orientation is found by searching a linked list of spherical triangles. The entire viewing area (or dome) is broken into non-overlapping and continuous spherical triangles. Three vertices are used to define each of these spherical triangles and are shown in FIG. 1 as vertex A, vertex B, and vertex C. The vertices taken as pairs form the sides of the spherical triangle. The sides are then used to form planes with the nominal eye point E. For example, vertices C and B form a plane with the nominal eye point E through one side of the spherical triangle. This pair of vertices (C and B) and the nominal eye point E form a plane shown as Plane ECB.

Figure 2:
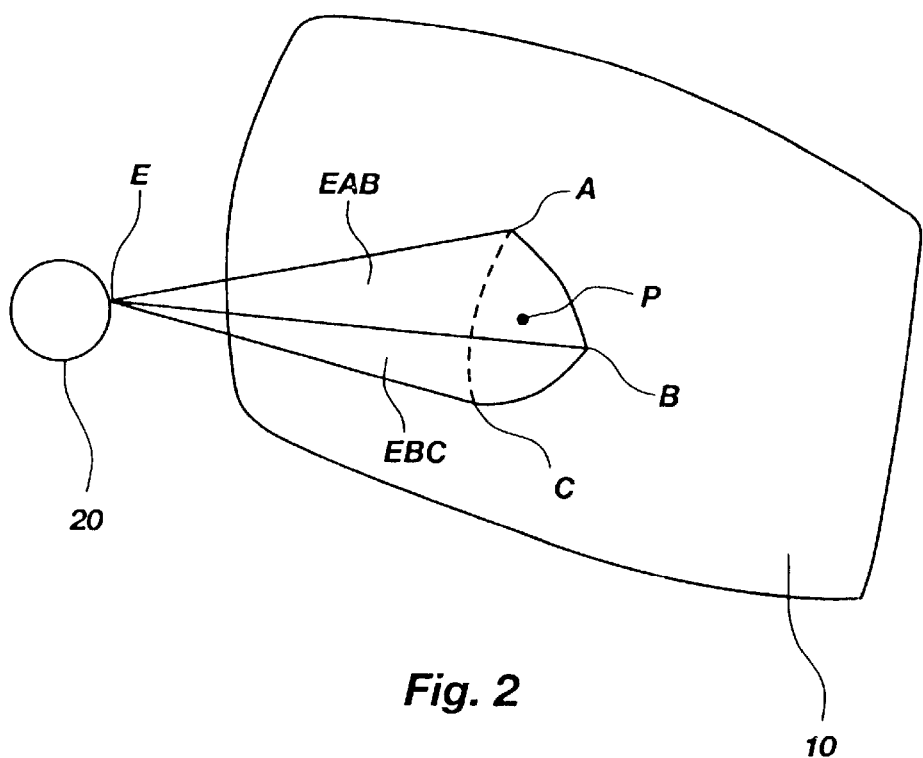
FIG. 2 shows a perspective view of a user, such as a pilot, viewing a portion of a dome shaped screen.

FIG. 2 shows a perspective view of a user 20, perhaps a pilot, viewing a portion of a dome shaped screen 10. As mentioned, a plane is computed between each pair of vertices and the nominal eye point E. The planes are shown in FIG. 2 as EAB and EBC. (EAC is hidden.) It can be seen that these three planes form a closed volume with the nominal eye point E at one end and pass through the spherical triangle.

To test to see if the interpolated view point P is within this viewing volume, a series of dot product checks must be made. Each plane has a unit normal vector associated with it. There is also a sign associated with each unit normal vector. Performing a dot product of the view point P and the unit normal vector creates a signed scalar value. The sign (positive or negative) of this scalar is compared with the sign associated with the unit normal vector. The sign associated with the unit normal vector is created so that an interpolated view point P inside of the viewing volume will match signs. If the test passes for each of the unit normal vectors associated with the planes, the point is within that viewing volume defined for that triangle. If the test fails, there is a pointer to the definition of the adjacent triangle defined with each plane. This triangle becomes the next triangle tested. This testing process continues until a triangle is found that contains the interpolated view point P. If the result of a dot product is zero, it is considered to be positive and matches a positive sign. The search begins each frame with the last triangle where the interpolated view point was found.

Because the measurement of head motion is continuous, with no discrete changes, the search algorithm always finds the appropriate triangle quickly. To keep the processing time down the algorithm quits searching after a fixed number of tries. The preferred number of search tries is five but it should be recognized that this may vary depending on the actual implementation of this invention. The requirement for a closed mesh of triangles or mesh bounding planes is important since the search method must be able to find an adjacent triangle or bounding plane. The identity of the triangle found in the last search is retained until such time as the spherical triangle containing the updated interpolated view point P being searched for is found. When there is no triangle associated with a bounding plane, the algorithm checks the planes associated with the adjacent triangles. If the results indicate that the point is in an adjacent triangle, the pointer is moved to that triangle.

In an alternative aspect of the invention, a triangle definition can indicate that there is no triangle on the other side of the plane. This results in stopping the search because the user is looking outside the projection area. As a result, the point is passed through unchanged.

Figure 3:
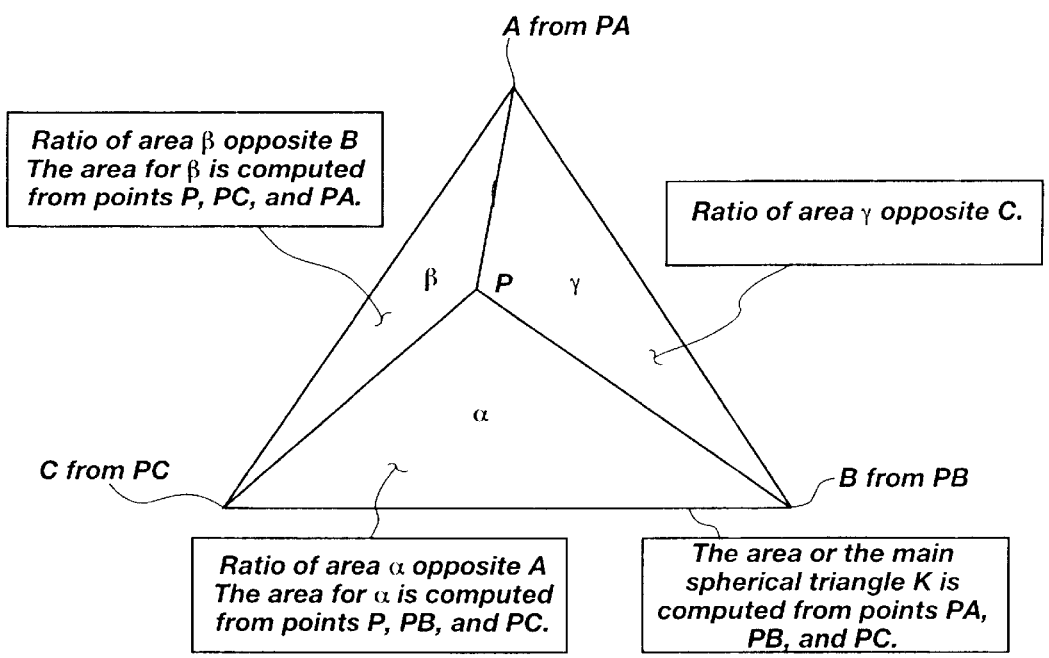
FIG. 3 shows a triangle used in the method for anticipating and tracking eye movement where the triangle is divided into three sub-triangles.

When the correct triangle which contains the interpolated view point P is found, the invention temporarily creates three sub-triangles from the view point paired with each of the original triangle's vertices. Referring to FIG. 3, the vertices of the triangle are labeled A, B, and C and the pairings become the interpolated view point P with vertices, to form the new sub-triangles PAB, PBC and PAC. The surface areas of these sub-triangles are used to create three ratios that represent the ratio of the original triangle's surface area versus the sub-triangles' surface areas. The sub-triangles are shown in FIG. 3 as α, β, and γ. It should be realized that the ratios of the sub-triangles surface areas will sum to one. In other words, the ratios represent the sub-triangles' percentages of the spherical triangle area. These ratios are multiplied with the calibration values stored along with each vertex, to create a new value for the interpolation point. It is important to reiterate that the calibration values store the value of the difference between the measured orientation of the user's head, when they are looking at the point, and the actual orientation of the point. Eye movement relative to the head accounts for the difference between the actual and measured orientations. The interpolation of these values then accounts for the eye to head relationship by recognizing that a user's eyes actually move relative to the head.

Now a detailed discussion of the computations used to find the sub-triangle ratios and calibration values which modify the interpolated view point will be covered. All of the spherical triangle area computations are done on a unit sphere. This is a simplification that allows the magnitude of the dot products and cross products to be used directly in the computations. Since the results of the computations are ratios of areas, the ratio is independent of the radius of the sphere. The unit vectors do not require computing the magnitude (value divided by the square root of the sum of the squares) and then scaling the results. So, the computations are done using unit vectors or as if the sphere was a unit sphere. In addition the results are checked and if a zero is produced that would become a divisor, an appropriate substitution is applied to the computations so divide by zero errors are not encountered.

There are two main parts to the computations. First, the angle between each pair of vertices must be calculated. The known quantities are the origin, the three points that are the vertices of the triangle, and the interpolated view point. The second part is the computation of the areas of four spherical triangles.

Referring again to FIG. 3, the first area which must be derived is the area of the main spherical triangle defined by the calibration points. The three points are PA, PB and PC. PA is the point at vertex A in FIG. 2 and vertices B and C are similarly named. The area of this spherical triangle is constant and is stored as a part of the definition of a spherical triangle which is computed before run time. The other three computations are completed during each frame. (Actually two are computed using the formulas below and the third, as will be pointed out later, is derived from the other two.) Each sub-triangle area is computed by using the view point P and two of the points from the main spherical triangle.

The basic computations for any spherical triangle (including the sub-triangles) are given in the following explanation. Each of the points are converted into a unit vector in the direction of the point, and as mentioned above the computations are then performed on a unit sphere which is identical to the original sphere except for the size.

$$\vec{ua} = \overline{PA}/|\overline{PA}|$$

$$\vec{ub} = \overline{PB}/|\overline{PB}|$$

$$\vec{uc} = \overline{PC}/|\overline{PC}|$$

$$CA = \vec{ub} \cdot \vec{uc}$$

$$CB = \vec{uc} \cdot \vec{ua}$$

$$CC = \vec{ua} \cdot \vec{ub}$$

$$SA = |\vec{ub} \times \vec{uc}|$$

$$SB = |\vec{uc} \times \vec{ua}|$$

$$SC = |\vec{ua} \times \vec{ub}|$$

These equations produce an approximation for the cord length between the points. The spherical triangles are assumed to be small with respect to the dome and less than ⅛ of the dome surface as a minimum. The error from the approximation of the cord length gets larger as the cord length between the points becomes greater. In other words, the error increases as the ratio between the spherical triangle area and the dome area increases. It should be realized that this knowledge is applied to the definition of the spherical triangles in the actual implementation of the invention.

The values CA, CB, and CC as well as SA, SB, and SC are scalar values representing cosine or sine of the angles of the triangles. Using the law of cosines for spherical triangles we can produce the angles for the respective vertices.

$$angleA=(\cos(CA)-(\cos(CB)\cos(CC)))/(\sin(SB)\sin(SC))$$

$$angleB=(\cos(CB)-(\cos(CC)\cos(CA)))/(\sin(SC)\sin(SA))$$

$$angleC=(\cos(CC)-(\cos(CA)\cos(CB)))/(\sin(SA)\sin(SB))$$

The spherical area of the resulting triangle (on a unit sphere) is:

$$K=(angleA+angleB+angleC-\phi)$$

This value is computed first for the spherical triangle and stored in the database where it can be retrieved at run time. Then the spherical area is computed for each of the three triangles defined by taking the interpolated view point inside the triangle with pair wise combinations of the triangle's vertices. In the preferred embodiment of the invention, the two sets of vertices combined with the point are calculated. The third area is derived from the first two to reduce computational complexity and error.

The three areas created correspond to the area opposite a corresponding vertex as shown in FIG. 3. Sub-triangle Alpha (α) is opposite vertex A so that as point P approaches vertex A the ratio of the area of the triangle "alpha" to the area of the main triangle approaches one. In other words, as point P gets closer to vertex A, the ratio that will be multiplied by the calibration value increases and thus A's calibration value affects P more. FIG. 3 also shows that sub-triangle Beta (β) is opposite vertex B and sub-triangle Gamma (γ) is opposite vertex C.

The ratio of a sub-triangle's area to the main triangle's area is computed by dividing the computed area, for any of the sub-triangles, by the area of the main spherical triangle as in the following equations:

$$\alpha=K_\alpha/K$$

$$\beta=K_\beta/K$$

$$\gamma=1-(\alpha+\beta)$$

where K is the area of the main triangle and $K_\alpha$, and $K_\beta$, are the areas of sub-triangles Alpha and Beta.

In the preferred implementation of the invention, the area of γ is computed by subtracting the sum of the two ratios α and γ from 1. This eliminates the possibility of the ratio of the areas of the spherical triangles not summing to 1 within the resolution and precision of the computation hardware.

Calibration values (or error values) are stored with the information associated with each vertex A, B and C. The correction value V for the interpolated view point P is:

$$V=\alpha V_A+\beta V_B+\gamma V_C$$

where α, β and γ are the computed ratios and $V_A$, $V_B$, $V_C$ represent the calibration values related to the appropriate coordinate system. This correction value is used to create the pseudo head orientation as calibrated for the eye to head relationship for a particular set of calibration points defining a spherical triangle. The calibrated heading and pitch values are used to correct the heading and pitch of the projected or viewed image. It should also be recognized that it is possible to interpolate position values in a Cartesian space (X, Y, Z) using this technique.

Figure 4:
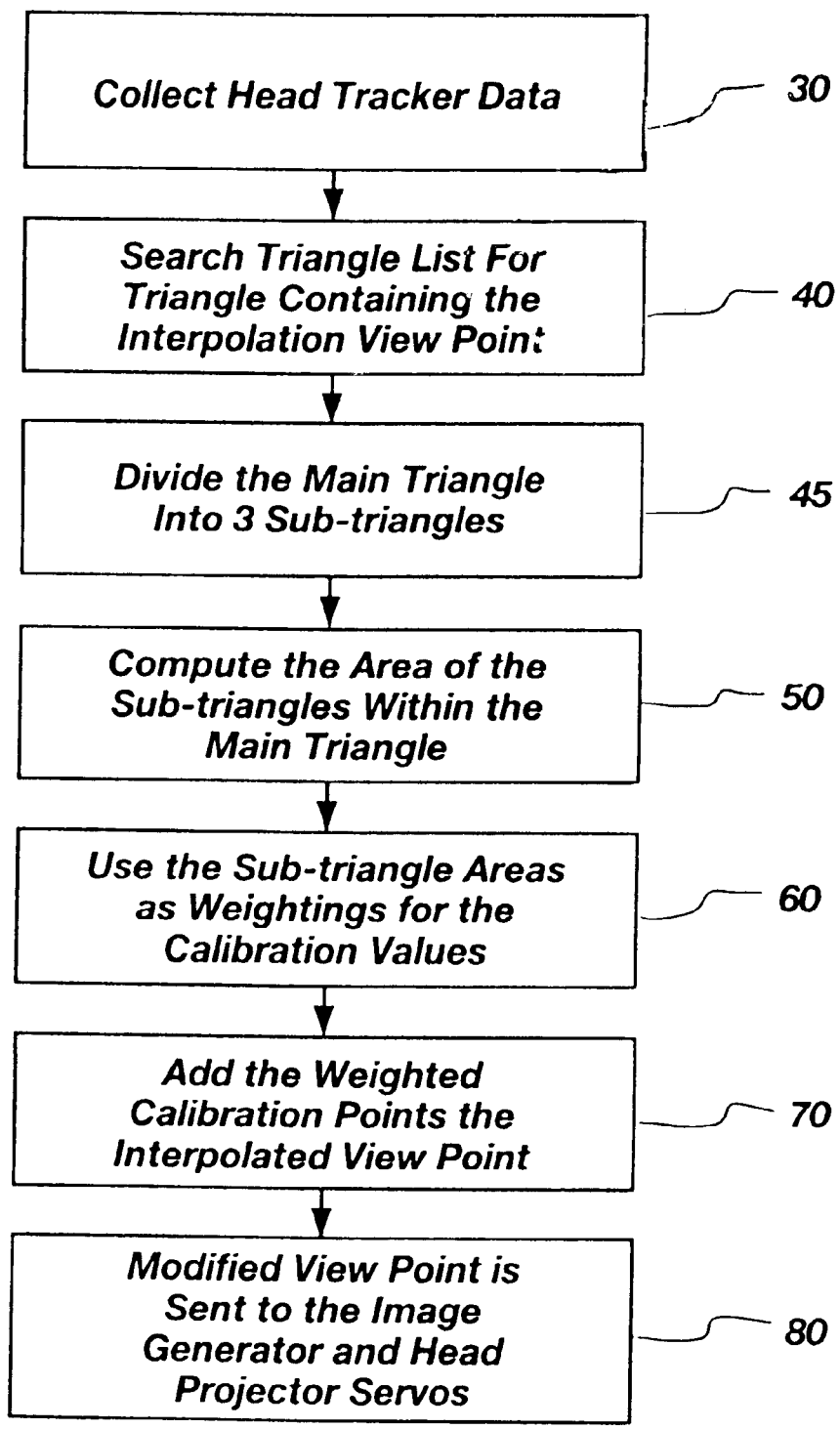
FIG. 4 shows a summary of the steps used in the method for anticipating a user's eye movements.

In summary, the steps of the current invention will now be described. The run-time method receives information from the head tracker equipment, as shown in step 30 of FIG. 4. The next step is to search for the appropriate interpolation triangle 40 by performing by a dot product test between the interpolated view point and the unit normal vectors inside the three planes that make up the sides of the spherical triangle extended back to the eye point. When a dot product test fails for the triangle a pointer is followed to the adjacent triangle where the test starts over. After the triangle is found that has the interpolated view point inside it, the main triangle is divided into three sub-triangles as in step 45. Then the area of the sub-triangles inside the selected main triangle is computed 50. In the next step 60, the sub-triangle areas are then used as ratios for weighting the calibration points stored with each vertex. Then the weighted calibrations are added to the values for the interpolated view point 70, and this creates a new calibrated point where the head tracked projector projects an image 80. The head tracked projector is controlled by servos and so the corrections are translated into physical movements in the image projection hardware.

Referring now to FIGS. 5A and 5B, tables of sample calculations generated using the method of this invention are shown. The coordinates of vertices A, B and C are shown defined as Cartesian coordinates in the X, Y and Z axes. The area of the triangle is shown as it would be stored in the database and calculated before the run time portion of the method of this invention is executed. FIG. 5B shows the sub-triangles' Area Ratios which are calculated based on the interpolated view point or the Test Point shown in FIG. 5A. These ratios sum to one as described. The calculated point after it has been interpolated with the weighted calibration values is also shown under the heading "Calculated Point from Interpolation".

The data stored in the database which is generated off-line consists of the data as described in the list below and the calibration value or "error" associated with each calibration point (i.e. triangle vertex). For each spherical triangle the following values are stored in the database:

1. The triangle name (for debugging only).
2. The vertex coordinates for each of the triangle vertices and measured calibration values associated with each vertex.
3. The spherical triangle angle associated with each vertex.
4. The plane normal for each side of the triangle and a sign for that normal. (For efficiency, the normal is stored once for the triangle on each side. The sign is used to change the sign of the dot product used to test for inside of the triangle.)
5. A pointer to the adjacent triangle across each side of the triangle.
6. The area of the spherical triangle defined by the three vertices and the sphere they are on.

As described, the database consists of a collection of points on the dome surface. These points can be specified in different coordinate systems which are equivalent. In the preferred embodiment of the invention, the points are expressed in the Cartesian coordinate system with the origin set at the dome center or the nominal eye point. In an alternative embodiment of the invention, the points can be expressed as angles in azimuth and elevation relative to the dome center or the nominal eye point.

The information for each triangle is constant during run time operation; therefore, the data structures are created as a separate task before run time. The head orientation calibration measurements are also generated separately from the other parts of the triangle definition. At run time, the invention loads this previously created stored data without the need for further input from the simulator user.

The database collection methods which will be used as part of this invention will now be discussed. The basic method of data collection used in this invention is to have the person follow a projected image as it is moved to point at each data point (i.e. triangle vertex). In some applications, the calibration point is always moved from the "straight ahead" point to the calibration point. This has the effect of requiring the person to perform the same task as when the data is being collected in a head tracking application. The measured data is stored in the data structures as it is collected. When all of the data is collected, a complete calibration map is available for use. In an alternative embodiment of the invention, the person may be required to follow a moving calibration image which also allows head velocity information to be captured.

It should be apparent based on this disclosure, that it is not efficient to have each user of a head tracked simulator take the time required to calibrate the system uniquely for them. Accordingly, there are at least three approaches to data acquisition for this tracking invention. One approach is to collect data on each individual as an initial calibration. Another approach is to collect calibration data for a group of people and use the average values for the group as the data. This method does not create an optimal calibration for a particular individual but it does not require any extra time when the user begins using the simulator. The third approach generally optimizes for the individual user but it avoids any setup time. This approach uses the average calibration data which is optimized for an individual by building the average from a group of people who closely represent the target population. For example, military pilots have certain physical requirements and the calibration group could be selected to conform to this group.

In an alternative embodiment of the invention, angular velocity measurements or acceleration are used to augment the head tracker orientation measurements. This allows the method of the current invention to use of velocity and acceleration information in determining the calibration which is added to the interpolated view point. Concentric maps based on motion information can also be created and the invention may then select the appropriate motion map and blend between it and the nearest points in the calibration map.

A second alternative embodiment of the invention "restores over time" since within some physiological limits, the user's head catches up with their eyes. There is a tendency for a person to center their eyes with respect to their head except at extreme head orientations. A third embodiment of the current invention uses data gathered dynamically by collecting the data based on having the person follow a continuously time varying sequence of points around the dome. The data can be gathered based upon visiting the calibration points many times and from many different directions. This allows concentric maps to be built up which are selected based upon where the person is currently looking and where they were looking just before that.

This invention provides the advantage that a person using a head tracked simulation system with the current invention feels like the image is staying with their eyes more naturally than without the use of this invention.

In another alternative embodiment, this invention could also be used with an image generation system where the images are displayed on cathode ray tube (CRT) displays, liquid crystal displays, plasma displays, rear projection displays, helmet mounted displays or any equivalent display that could be used with a head tracked image generation system.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for anticipation and tracking of a user's eye movements in a head tracked image generation system, comprising the steps of:

(a) defining a viewing surface segmented into a plurality of contiguous triangles across the viewing surface upon which a head tracked image generator displays computer generated images, wherein the contiguous triangles are selected from the group consisting of planar triangles, spherical triangles and contoured triangles;

(b) identifying a plurality of calibration values for vertices of the triangles;

(c) developing a value from the calibration values representing a difference between (i) a user's head orientation and (ii) where a user is actually looking;

(d) interpolating a user's view point onto the viewing surface to determine an interpolated view point where the images should be displayed on the viewing surface;

(e) searching the plurality of triangles to find a selected triangle which contains the interpolated view point;

(f) dividing the selected triangle containing the view point into three contiguous sub-triangles with common edges extending from three vertices of the selected triangle to a common vertex point corresponding to the view point;

(g) comparing surface areas of the sub-triangles with the selected triangle; and (h) correlating comparative surface areas with the calibration values to identify a proper position for the computer generated images.

2. The method of claim 1 wherein the step of comparing surface areas of the sub-triangles with the selected triangle further comprises calculating surface area ratios of the three sub-triangles in relation to the surface area of the selected triangle.

3. The method of claim 2 wherein the step of correlating comparative surface areas with the calibration values further comprises the steps of:

multiplying the surface area ratios of the sub-triangles with the calibration values at each vertex opposite the sub-triangles in the selected triangle to create weighted calibration values; and adding the weighted calibration values to the interpolated view point to allow the head tracked projector to use a calibrated interpolation point to ascertain where the computer generated images should be displayed on the projection surface.

4. The method of claim 3 wherein the step of multiplying the surface area ratios of the sub-triangles with the calibration values at each vertex of the original triangle to create weighted calibration values further comprises the step of executing the equation:

$$V = \alpha V_A + \beta V_B + \gamma V_C$$

wherein V represents the weighted calibration values in the x, y and z-coordinate axes to be added to the interpolated view point, α represents the ratio of the first sub-triangle area to the selected triangle area, β represents the ratio of the second sub-triangle area to the selected triangle area, γ represents the ratio of the third sub-triangle area to the selected triangle area, $V_A$ represents the calibration values for a first vertex A of the selected triangle wherein sub-triangle α is opposite $V_A$, $V_B$ represents the calibration values for a second vertex B of the selected triangle where in sub-triangle β is opposite $V_B$, $V_C$ represents the calibration values for a third vertex C of the selected triangle, wherein sub-triangle γ is opposite $V_C$.

5. The method of claim 1 wherein the step of searching the plurality of triangles to find a selected triangle which contains the interpolated view point, further comprises the steps of:

selecting a current triangle as a starting point for a search;

testing to see if the interpolated view point is within the current triangle;

moving to a next adjacent triangle when the interpolated view point is not within the current triangle; and selecting the current triangle when the interpolated view point is within the current triangle.

6. The method of claim 5 wherein the step of testing to see if the interpolated viewing point is within the current triangle further comprises the steps of:

forming three planes which extend between a user's nominal eye point and each pair of vertices in the current triangle, wherein each plane has a unit normal vector and the planes form a pyramid shaped closed volume having the nominal eye point as the apex;

performing a dot product test between the interpolated view point and the unit normal of each plane to create a signed scalar value; and comparing a sign of the scalar value with a sign of the unit normal vector such that when the interpolated view point is within the triangle, the sign associated with each unit normal vector will match the sign of the interpolated point.

7. The method of claim 5 wherein the step of selecting a current triangle as a starting point for a search further comprises selecting a triangle as a starting point for a search which contained the interpolated view point in a previous computer generated image frame.

8. The method of claim 1 wherein the step of comparing surface areas of the sub-triangles with the selected triangle further comprises of the step of finding the surface areas of the selected triangle and each of its sub-triangles.

9. The method of claim 8 wherein the step of finding the surface areas of the selected triangle and each of its sub-triangles further comprises the steps of:

calculating an angle between each pair of vertices in the selected triangle;

forming three cords between each of the selected triangles vertices and the interpolated view point;

finding the approximate length of a cord between each pair of vertices;

finding the angles for each of the three vertices;

computing the area of the selected triangle; and computing the areas of the sub-triangles.

10. The method of claim 8 wherein the step of finding the surface areas of the selected triangle and each of its sub-triangles further comprises the step of executing the equation:

$$K = (\text{angle}A + \text{angle}B + \text{angle}C - \phi)$$

wherein K represents the area of a triangle, angleA represents the angle of a first vertex in a triangle, angleB represents the angle of a second vertex in a triangle, and angleC represents the angle of a third vertex in a triangle.

11. The method of claim 1 wherein the step of comparing surface areas of the sub-triangles with the selected triangle further comprises finding the surface area ratios of the sub-triangles by taking the area of each of the three sub-triangles and dividing by the area of the selected triangle.

12. The method of claim 1 wherein the triangles provided with the projection surface are less the ⅛ of the projection surface size.

13. The method of claim 1 wherein step of providing a plurality of triangles further comprises providing a plurality of triangles wherein each triangle is adjacent to at least one other triangle.

14. The method of claim 1 wherein the step of providing a plurality of triangles further comprises the step of providing a plurality of triangles which are bounded by a plane and each triangle is bounded by at least one other triangle and 2 planes.

15. The method of claim 1 wherein the step of providing a plurality of triangles further comprises the step of providing a plurality of triangles which are bounded by a plane and each triangle is bounded by at least two other triangles and 1 plane.

16. The method of claim 1 wherein the triangle vertices are represented in the Cartesian coordinate system.

17. The method of claim 1 wherein the representation of the triangles in the Cartesian coordinate system have an origin set at the nominal eye point.

18. The method of claim 1 wherein the vertices of the triangles are represented in the azimuth and elevation coordinate system.

* * * * *